United States Patent [19]
Licht et al.

[11] Patent Number: 5,905,113
[45] Date of Patent: *May 18, 1999

[54] AQUEOUS LATENT-CROSSLINKING POLYURETHANE DISPERSIONS

[75] Inventors: Ulrike Licht, Mannheim; Nicolas Kokel, Ludwigshafen; Karl Häberle, Speyer; Maximilian Angel, Schifferstadt; Peter Weyland, Frankenthal; Günter Scherr, Ludwigshafen, all of Germany

[73] Assignee: BASF Aktiengesellschaft, Ludwigshafen, Germany

[ * ] Notice: This patent is subject to a terminal disclaimer.

[21] Appl. No.: 08/855,948

[22] Filed: May 14, 1997

[30] Foreign Application Priority Data

May 15, 1996 [DE] Germany .................... 196 19 636

[51] Int. Cl.$^6$ .............. C08J 3/00; C08K 3/20; C08L 75/00; C08F 283/04
[52] U.S. Cl. ............ 524/591; 525/452; 525/453; 525/454; 525/455
[58] Field of Search ............... 525/452, 453, 525/454, 455; 524/591

[56] References Cited

U.S. PATENT DOCUMENTS 5,306,764  4/1994  Chen ........................ 524/591

FOREIGN PATENT DOCUMENTS 0183119  6/1986  European Pat. Off. .
0184302  6/1986  European Pat. Off. .
044357A2  8/1991  European Pat. Off. .
0704469 A2  4/1996  European Pat. Off. .
0794204  9/1997  European Pat. Off. .

*Primary Examiner*—Patrick D. Niland
*Attorney, Agent, or Firm*—Oblon, Spivak, McClelland, Maier & Neustadt, P.C.

[57] ABSTRACT

Aqueous latent-crosslinking polyurethane dispersions, comprising

I) a disperse phase (P.I) including
   Ia) polyurethanes (PUR.Ia) carrying not only groups which render the polyurethane dispersible in water but also groups with a C—C double bond which is activated by a carbonyl attached directly to it, or
   Ib) a mixture of
      a polyurethane (PUR.Ib) carrying groups which render the polyurethane dispersible in water but no groups with a C—C double bond which is activated by carbonyl attached directly to it, and
      a compound (V.I) different from the polyurethanes PUR.Ia and PUR.Ib, which carries groups with a C—C double bond which is activated by a carbonyl attached directly to it, and
II) a compound having
    on average at least 2 hydrogens present as amino function,
    a solubility in water of more than 1 g/l (25° C.) and
    a number-average molecular weight ($M_n$) of from 200 to 1,000,000 (compound II).

10 Claims, No Drawings

AQUEOUS LATENT-CROSSLINKING POLYURETHANE DISPERSIONS

The present invention relates to aqueous, latent-crosslinking polyurethane dispersions comprising I) a disperse phase (P.I) including
   Ia) a polyurethane (PUR.Ia) carrying not only groups which render the polyurethane dispersible in water but also groups with a C—C double bond which is activated by a carbonyl attached directly to it, or
   Ib) a mixture of
      a polyurethane (PUR.Ib) carrying groups which render the polyurethane dispersible in water but no groups with a C—C double bond which is activated by carbonyl attached directly to it, and
      a compound (V.I) different from the polyurethanes PUR.Ia and PUR.Ib, which carries groups with a C—C double bond which is activated by a carbonyl attached directly to it.

The invention also relates to the use of the dispersions as coating compositions or adhesives.

Aqueous dispersions containing a polyurethane in dispersed form are widely known. In order that coatings produced from the polyurethane possess particularly good mechanical properties, a crosslinking component is added to these dispersions. What is desired in particular here is for the crosslinker to bring about the build up in the molecular weight of the polyurethane only once the polyurethane dispersion has, following its application to the workpiece to be coated, already formed a film. Under these circumstances, films are obtained whose cohesion is particularly high, since in this case too the polymer molecules of one dispersion particle can be linked by a covalent bond to the polymer molecules of a different, adjacent dispersion particle.

In the field of adhesives, for example, particularly good film cohesion is especially necessary when the adhesive bond is subject to mechanical loading accompanied by the action of heat.

To obtain adhesive bonds of sufficient strength even under such conditions it has been recommended, in EP-A-206059 for example, to add a water-emulsifiable polyisocyanate as crosslinker to the dispersions a short time before their application as an adhesive.

The disadvantage of these two-component or two-pack systems, however, is that the pot life—that is, the period within which these systems can be processed after they have been mixed—is severely restricted. Since, moreover, the two-component system cannot be stored for a long period and the processor has to carry out the extra step of preparing a defined quantity of adhesive which can be applied in the course of one working cycle, the effort which needs to be exerted by the adhesives processor in the case of two-component systems is higher than in the case of one-component systems.

Latent-curing dispersions which can be stored for a longer period, ie. dispersions which do in fact include a hardener which, however, only develops its complete effect after the dispersions have been processed, are known, for example, from EP-A-442 652. The dispersions comprise, for example, a polyurethane having an aldehydic or keto carbonyl, and adipic dihydrazide as crosslinker. However, in terms of strength at elevated temperature these dispersions are in need of improvement.

EP-A-443 537 discloses aqueous dispersions of polyurethanes which carry acryloyl groups. The recommendation is given to use these dispersions for film lamination, where the dispersion is applied to a film, the film is bonded to another substrate, and the adhesive is cured by irradiation with UV light.

Acryloyl-containing polyurethane dispersions are also known from EP-A-443 537, 183 119, 181 486, 189 945 and 353 797.

EP-419 945 discloses the crosslinking of aqueous-dispersed NCO-terminated polyurethane prepolymers with pentaethylenehexamine, in the course of which urea groups are formed.

German Patent Application 1960 86 10.8, which is not a prior publication, discloses dispersions comprising, in separate phases, polyurethane carrying C—C double bonds which are activated on carbonyl groups, or mixtures of a polyurethane with another polymer carrying such groups (phase I) and a polyamine (phase II) whose solubility in water is low.

It is an object of the present invention, therefore, to provide a further latent-curing aqueous polyurethane dispersion which is free from the disadvantages of the prior art and possesses, in particular, good stability on storage, and can be used to produce thermally stable bonds.

We have found that this object is achieved by the aqueous dispersions defined at the outset.

The disperse phase (P.Ia) usually contains from 0.05 to 3 mol/kg, preferably from 0.2 to 1 mol/kg, of groups with a C—C double bond which is activated by a carbonyl attached directly to it.

The phase (P.I) preferably comprises, or particularly preferably consists of, a polyurethane (PUR.Ia), composed of
   a1) polyfunctional isocyanates of 4 to 30 carbons,
   a2) polyols, of which
      a2.1) from 10 to 100 mol-%, based on the overall amount of the polyols (a2), have a molecular weight of from 500 to 5000, and
      a2.2) from 0 to 90 mol-%, based on the overall amount of the polyols (a2), have a molecular weight of from 60 to 500 g/mol,
   a3) monomers which are different from monomers (a1) and (a2) and have at least one isocyanate group or at least one isocyanato-reactive group and which, moreover, carry at least one hydrophilic group or potentially hydrophilic group, by means of which the polyurethanes are made dispersible in water,
   a4) monomers which are different from monomers (a1), (a2) and (a3) and have at least one isocyanate group or at least one isocyanato-reactive group and which, moreover, carry at least one group having a C—C double bond which is activated by a carbonyl attached directly to it, and
   a5) if desired, further polyfunctional compounds which are different from the monomers (a2) to (a4) and have isocyanato-reactive groups which are alcoholic hydroxyl or primary or secondary amino groups.

Suitable monomers (a1) are the polyisocyanates customarily employed in polyurethane chemistry.

Mention may be made in particular of diisocyanates $X(NCO)_2$, where X is an aliphatic hydrocarbon radical of 4 to 12 carbons, a cycloaliphatic or aromatic hydrocarbon radical of 6 to 15 carbons or an araliphatic hydrocarbon radical of 7 to 15 carbons. Examples of such diisocyanates are tetramethylene, hexamethylene and dodecamethylene diisocyanates, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4- and 2,6-diisocyanatotoluene, 4,4'- and 2,4-diisocyanatodiphenylmethane, p-xylylene diisocyanate, the isomers of bis(4-isocyanatocyclohexyl)methane, such as the trans/trans, the cis/cis and the cis/trans isomer, and mixtures of these compounds.

Particularly significant mixtures of these isocyanates are the mixtures of the respective structural isomers of diisocyanatotoluene and diisocyanatodiphenylmethane, especially the mixture comprising 80 mol-% of 2,4 diisocyanatotoluene and 20 mol-% of 2,6-diisocyanatotoluene. Furthermore, the mixtures of aromatic isocyanates, such as 2,4 diisocyanatotoluene and/or 2,6-diisocyanatotoluene, with aliphatic or cycloaliphatic isocyanates, such as hexamethylene diisocyanate or IPDI, are particularly advantageous, the preferred ratio of aliphatic to aromatic isocyanates in mixtures being from 4:1 to 1:4.

As compounds (a1) it is also possible to employ isocyanates carrying not only free but also additional, capped isocyanate groups, for example uretdione or carbodiimide groups.

If desired, it is also possible to use those isocyanates which have only one isocyanate function. The proportion thereof is generally not more than 10 mol-% based on the overall molar quantity of monomers. These monoisocyanates usually carry further functional groups, such as olefinic or carbonyl groups, and their purpose is to introduce into the polyurethane functional groups which allow the polyurethane to be dispersed or crosslinked or to undergo further polymer-analogous reaction. Monomers suitable for this purpose include isopropenyl-α,α-dimethylbenzyl isocyanate (TMI).

To prepare polyurethanes with a certain degree of branching or crosslinking it is possible, for example, to use trifunctional and tetrafunctional isocyanates. Isocyanates of this kind are obtained, for example, by reacting difunctional isocyanates with one another, derivatizing some of their isocyanate groups to form allophanate or isocyanurate groups. Examples of customary commercial compounds are the isocyanurate or the biuret of hexamethylene diisocyanate.

From the standpoint of good film formation and elasticity, suitable polyols (a2) are ideally those of relatively high molecular mass (a2.1), preferably diols having a molecular weight from about 500 to 5000, preferably from about 100 to 3000 g/mol.

The diols (a2.1) are, in particular, polyesterpolyols known, for example, from Ullmanns Encyklopädie der technischen Chemie, 4th edition, Volume 19, pp. 62–65. Preference is given to the use of polyesterpolyols which are obtained by reacting dihydric alcohols with dibasic carboxylic acids. In place of the free polycarboxylic acids it is also possible to use the corresponding polycarboxylic anhydrides or corresponding polycarboxylic esters of lower alcohols, or mixtures thereof, in order to prepare the polyesterpolyols. The polycarboxylic acids may be aliphatic, cycloaliphatic, araliphatic, aromatic or heterocyclic and may be unsubstituted or substituted, for example by halogens, and/or unsaturated. Examples of such acids are suberic, azeleic, phthalic, isophthalic, maleic and fumaric acids, phthalic, tetrahydrophthalic, hexahydrophthalic, tetrachlorophthalic endomethylenetetrahydrophthalic, glutaric and maleic anhydrides and dimeric fatty acids. Preferred dicarboxylic acids are those of the formula HOOC—$(CH_2)_y$—COOH, where y is 1–20, preferably an even number from 2 to 20, examples being succinic, adipic, dodecanedicarboxylic and sebacic acids.

Examples of suitable polyhydric alcohols are ethylene glycol, 1,2-propanediol, 1,3-propanediol, 1,3-butanediol, 1,4-butenediol, 1,4-butynediol, 1,5-pentanediol, neopentylglycol, bis(hydroxymethyl)cyclohexanes such as 1,4-bis(hydroxymethyl)cyclohexane, 2-methyl-1,3-propanediol, methylpentanediols, and also diethylene, triethylene, tetraethylene, polyethylene, dipropylene, polypropylene, dibutylene and polybutylene glycols. Preferred alcohols are those of the formula HO—$(CH_2)_x$—OH, where x is 1–20, preferably an even number from 2 to 20, examples being ethylene glycol, 1,4-butanediol, 1,6-hexanediol, 1,8-octanediol and 1,12-dodecanediol.

Also suitable are polycarbonatediols as can be obtained, for example, by reacting phosgene with an excess of the low molecular mass alcohols mentioned as structural components for the polyesterpolyols.

Lactone-based polyesterdiols are also suitable, these being homopolymers or copolymers of lactones, preferably adducts, containing terminal hydroxyl, of lactones with suitable difunctional starter molecules. Preferred lactones are those derived from compounds of the formula HO—$(CH_2)_z$—COOH where z is 1–20, examples being ε-caprolactone, β-propiolactone, gamma-butyrolactone and/or methyl-ε-caprolactone, and mixtures thereof. Examples of suitable starter components are the low molecular mass diols mentioned above as structural components for the polyesterpolyols. The corresponding polymers of epsilon-caprolactone are particularly preferred. Lower polyesterdiols or polyetherdiols can also be used as starters for preparing the lactone polymers. In place of the lactone polymers it is also possible to employ the corresponding, chemically equivalent polycondensation products of the hydroxycarboxylic acids corresponding to the lactones.

Other suitable monomers (a2.1) are polyetherdiols. These can be obtained in particular by polymerizing ethylene oxide, propylene oxide, butylene oxide, tetrahydrofuran, styrene oxide or epichlorohydrin with itself, for example in the presence of $BF_3$, or by carrying out addition reactions of these compounds, individually, as a mixture or in succession, with starter components containing reactive hydrogen, such as alcohols or amines, examples being water, ethylene glycol, 1,2-propanediol, 1,3-propanediol, 1,2-bis (4-hydroxyphenyl)propane and aniline. Particular preference is given to polytetrahydrofuran with a molecular weight from 240 to 5000, especially from 500 to 4500.

Suitability likewise extends to polyhydroxyolefins, preferably those with 2 terminal hydroxyls, examples being α,ω-dihydroxypolybutadiene, α,ω-dihydroxypolymethacrylic esters and α,ω-dihydroxypolyacrylic esters, as monomers (a2.1). Compounds of this kind are known, for example, from EP-A-0 622 378. Further suitable polyols are polyacetals, polysiloxanes and alkyd resins.

Polyols can also be used as mixtures in ratios of from 0.1:1 to 1:9.

The hardness and the modulus of elasticity of the polyurethanes can be increased if the diols (a2) used include not only diols (a2.1) but also low molecular mass diols (a2.2) with a molecular weight from about 62 to 500, preferably from 62 to 200 g/mol. Monomers (a2.2) used are, in particular, the structural components of the short-chain alkanediols mentioned for the preparation of polyester polyols, preference being given to unbranched $C_2$–$C_{12}$ diols with an even number of carbons.

The proportion of the diols (a2.1), based on the overall quantity of diols (a2), is preferably from 10 to 100 mol-% and the proportion of the monomers (a2.2), based on the overall quantity of the diols (a2), is preferably from 0 to 90 mol-%. With particular preference, the ratio of the diols (a2.1) to the monomers (a2.2) is from 0.2:1 to 5:1, particularly preferably from 0.5:1 to 2:1.

To render the polyurethanes dispersible in water, they are composed not only of components (a1) and (a2) but also of monomers (a3) which are different from components (a1) and (a2) and carry at least one isocyanate group or at least one isocyanato-reactive group and, moreover, at least one hydrophilic group or potentially hydrophilic group, ie. a group which can be converted to a hydrophilic group— referred to below for short as (potentially) hydrophilic groups. The (potentially) hydrophilic groups react with isocyanates much more slowly than do the functional groups of the monomers used to construct the polymer main chain.

The proportion of components having (potentially) hydrophilic groups among the total components (a1) to (a5) is generally such that the molar quantity of the (potentially) hydrophilic groups, based on the weight quantity of all monomers (a1) to (a5), is from 0.03 to 1, preferably from 0.05 to 0.5 and, with particular preference, from 0.08 to 0.3 mol/kg.

The (potentially) hydrophilic groups may be nonionic or, preferably, (potentially) ionic hydrophilic groups.

Particularly suitable nonionic hydrophilic groups are polyethylene glycol ethers comprising preferably in particular 5 to 100, preferably from 10 to 80, repeating ethylene oxide units. The content of polyethylene oxide units is generally from 0 to 10% by weight, preferably from 0 to 6% by weight, based on the weight quantity of all monomers (a1) to (a5).

Preferred monomers with nonionic hydrophilic groups are polyethylene glycol and diisocyanates carrying a terminally etherified polyethylene glycol radical. Diisocyanates of this kind and processes for their preparation are given in U.S. Pat. Nos. 3,905,929 and 3,920,598.

Ionic hydrophilic groups are, in particular, anionic groups, such as sulfonato, carboxylato and phosphato in the form of their alkali metal or ammonium salts, and also cationic groups such as ammonium groups, especially protonated tertiary amino or quaternary ammonium groups.

Potentially ionic hydrophilic groups are, in particular, those which can by simple neutralization, hydrolysis or quaternization be converted into the abovementioned ionic hydrophilic groups, thus for example carboxyl, tertiary amino or anhydride groups.

(Potentially) ionic monomers (a3) are described at length in, for example, Ullmanns Encyklopädie der technischen Chemie, 4th edition, Volume 19, pp. 311–313 and, for example, in DE-A 1 495 745.

As (potentially) cationic monomers (a3), monomers containing tertiary amino are of particular importance in practice, examples being tris(hydroxyalkyl)amines, N,N'-bis (hydroxyalkyl)alkylamines, N-hydroxyalkyldialkylamines, tris-(aminoalkyl)amines, N,N'-bis(aminoalkyl)alkylamines, and N-aminoalkyldialkylamines, where the alkyl and alkanediyl moieties are independently each of 2 to 6 carbons. Also suitable are polyethers containing tertiary nitrogens and preferably two terminal hydroxyls, as can be obtained in a manner known per se by, for example, alkoxylation of amines which carry two hydrogens attached to the amine nitrogen, for example methylamine, aniline or N,N'-dimethylhydrazine. Polyethers of this kind generally have a molecular weight of from 500 to 6000 g/mol.

These tertiary amines are converted into the ammonium salts either with acids, preferably strong mineral acids such as phosphoric acid, sulfuric acid or hydrohalic acids, or strong organic acids, or by reaction with suitable quaternizing agents, such as $C_1$–$C_6$-alkyl halides, for example the bromides or chlorides.

Suitable monomers having (potentially) anionic groups are usually aliphatic, cycloaliphatic, araliphatic and aromatic carboxylic acids and sulfonic acids which carry at least one alcoholic hydroxyl or at least one primary or secondary amino. Preference is given to dihydroxyalkanecarboxylic acids, especially those with 3 to 10 carbon atoms as are described in U.S. Pat. No. 3,412,054. Particularly preferred compounds are those of the formula

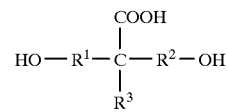

where $R^1$ and $R^2$ are $C_1$–$C_4$-alkanediyl and $R^3$ is $C_1$–$C_4$-alkyl, and especially dimethylolpropionic acid (DMPA).

Corresponding dihydroxysulfonic acids and dihydroxyphosphonic acids, such as 2,3-dihydroxypropanephosphonic acid, are also suitable.

Other compounds which are suitable are dihydroxy compounds with a molecular weight of upward of 500 to 10,000 g/mol and at least 2 carboxylate groups, as are known from DE-A 3 911 827. They are obtainable by reacting dihydroxy compounds with tetracarboxylic dianhydrides, such as pyromellitic dianhydride or cyclopentanetetracarboxylic dianhydride, in a molar ratio of from 2:1 to 1.05:1 in a polyaddition reaction. Particularly suitable dihydroxy compounds are the monomers (a2.2) mentioned as chain extenders and also the diols (a2.1).

Suitable monomers (a3), containing isocyanato-reactive amino groups, are aminocarboxylic acids, such as lysine, β-alanine, the adducts mentioned in DE-A 2 034 479 of aliphatic diprimary diamines with α,β-unsaturated carboxylic acids, such as N-(2-aminoethyl)-2-aminoethanecarboxylic acid, and also the corresponding N-aminoalkyl-aminoalkylcarboxylic acids in which the alkanediyls are of 2 to 6 carbons.

Where monomers with potentially ionic groups are employed, their conversion to the ionic form can take place before, during or, preferably, after the isocyanate polyaddition reaction, since the ionic monomers are frequently of poor solubility in the reaction mixture. With particular preference, the carboxylate groups are in the form of their salts with an alkali metal or ammonium ion as counterion.

Monomers (a4) which are different from the monomers (a2) and (a3) are, in particular, compounds having one or preferably two alcoholic hydroxyls, such as $C_1$–$C_6$-hydroxyalkyl acrylates, for example hydroxyethyl acrylate and hydroxypropyl acrylate, a $C_1$–$C_6$-hydroxyalkyl methacrylate, monoesters or diesters of acrylic or methacrylic acid and trimethylolpropane or glycerol, or the bisadduct of acrylic and/or methacrylic acid with a bisepoxide such as bisphenol A and bisphenol F.

In addition, the adduct of acrylic or methacrylic acid and butanediol diglycidyl ether is particularly suitable.

Further customary polyester polyols suitable as monomers (a4) are those composed at least in part of maleic acid and fumaric acid. Otherwise, these polyesters are constructed exactly like the polyesters which come under consideration as monomers (a2.2).

The monomers (a5) which may be used as structural components and which are different from the monomers (a2) to (a4) have the general purpose of crosslinking or chain extension. They are generally non-aromatic alcohols with a functionality of more than 2, amines with 2 or more primary and/or secondary aminos, and compounds combining one or more alcoholic hydroxyls with one or more primary and/or secondary aminos.

Alcohols with a functionality of more than 2 which can be used to establish a certain degree of branching or crosslinking are, for example, trimethylolpropane, glycerol and sucrose.

Also suitable are monoalcohols which in addition to the hydroxyl carry a further isocyanate-reactive group, such as monoalcohols having one or more primary and/or secondary aminos, a specific example being monoethanolamine.

Polyamines having 2 or more primary and/or secondary aminos are employed in particular when the chain extension and/or crosslinking is to take place in the presence of water, since amines generally react faster with isocyanates than do alcohols or water. This is frequently necessary when aqueous dispersions of crosslinked polyurethanes or polyurethanes of high molecular weight are desired. In such cases, the procedure is to prepare prepolymers containing isocyanate groups, to disperse them rapidly in water and then, by adding compounds having two or more isocyanate-reactive amino groups, to carry out chain extension or crosslinking.

Amines suitable for this purpose are, in general, polyfunctional amines from the molecular weight range from 32 to 500 g/mol, preferably from 60 to 300 g/mol, which contain at least two primary, two secondary or one primary and one secondary amino group. Examples thereof are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate, or triamines, such as diethylene triamine and 1,8-diamino-4-aminomethyloctane.

The amines can also be employed in blocked form, for example in the form of the corresponding ketimines (see for example CA-1 129 128), ketazines (cf. eg. U.S. Pat. No. 4,269,748) or amine salts (see U.S. Pat. No. 4,292,226). Oxazolidines as well, as are used for example in U.S. Pat. No. 4,192,937, are capped polyamines which can be used for chain extension of the prepolymers in preparing the novel polyurethanes. If capped polyamines of this kind are used, they are generally mixed with the prepolymers in the absence of water and this mixture is then mixed with the water of dispersion, or some of the water of dispersion, so that the corresponding polyamines are liberated by hydrolysis.

It is preferred to use mixtures of diamines and triamines, especially mixtures of isophoronediamine and diethylenetriamine.

The polyurethanes include preferably no polyamine or from 1 to 10 mol-%, particularly preferably from 4 to 8 mol-%, based on the overall amount of components (a2) to (a4), of a polyamine having at least 2 isocyanate-reactive amino groups, as monomers (a5).

It is advisable to employ compounds having primary or secondary aminos only in quantities such that the overall amount of the isocyanate groups present at the time of addition is greater than that of the primary or secondary aminos. If this is done it is possible to avoid a large proportion of the aminos reacting not with the isocyanate groups, to form urea, but instead with the acryloyl and/or methacryloyl groups.

In accordance with a likewise preferred embodiment, the phase (P.I) comprises or consists of a mixture of
 a polyurethane (PUR.Ib) and
 a polyurethane (PUR.Ic) as compound (V.I),
 the polyurethane (PUR.Ib) being composed of
  b1) polyfunctional isocyanates of 4 to 30 carbons,
  b2) polyols, of which
   b2.1) from 10 to 100 mol-%, based on the overall amount of the diols (b2), have a molecular weight of from 500 to 5000, and
   b2.2) from 0 to 90 mol-%, based on the overall amount of the diols (b2), have a molecular weight of from 60 to 500 g/mol,
  b3) monomers which are different from monomers (b1) and (b2) and carry at least one isocyanate group or at least one isocyanato-reactive group, and which, moreover, carry at least one hydrophilic group or a potentially hydrophilic group, whereby the polyurethanes are made dispersible in water, and
  b4) if desired, further polyfunctional compounds, different from the polyols (b2) and monomers (b3), having isocyanate-reactive groups which are alcoholic hydroxyls or primary or secondary aminos,
 and the polyurethane (PUR.Ic) is composed of
  c1) polyfunctional isocyanates of 4 to 30 carbons,
  c2) polyols, of which
   c2.1) from 10 to 100 mol-%, based on the overall amount of the diols (c2), have a molecular weight of from 500 to 5000, and
   c2.2) from 0 to 90 mol-%, based on the overall amount of the diols (c2), have a molecular weight of from 60 to 500 g/mol,
  c3) monomers which are different from monomers (c1) and (c2) and have at least one isocyanate group or at least one isocyanato-reactive group and which, moreover, carry at least one acryloyl or methacryloyl group.

Here, the ratio of the polyurethane (PUR.Ib) to compound (V.I) is generally from 0.5:1 to 10:1.

Particularly suitable monomers (b1), (b2), (b3) and (b4) are the corresponding monomers to which preference is given as monomers (a1), (a2), (a3) and (a5).

Particularly suitable monomers (c1), (c2.1), (c2.2) and (c3) are the corresponding monomers to which preference is given as monomers (a1), (a2.1), (a2.2) and (a4).

The monomers (c3) are preferably employed in amounts such that the polyurethane (PUR.Ic) contains from 0.2 to 4 mol per kg of groups with a C—C double bond which is activated by a directly attached carbonyl.

As compounds (V.I) the disperse phase (P.I) may also include acryloyl- or methacryloyl-containing esters as disclosed in EP-A-447 845, 279 303 or 127 766.

These esters are preferably esters obtainable by reacting
 Polyols as described as monomers (a2.1) and (a2.2), and higher alcohols of low molecular mass, such as glycerol, trimethylolpropane and pentaerythritol, which alcohols may be ethoxylated or propoxylated,
 di- to tetrabasic $C_3$–$C_{36}$ carboxylic acids, for example adipic acid, and
 acrylic and/or methyacrylic acid,
to form a carboxyl-containing polyester and then esterifying the carboxyls of this ester by reaction with equivalent amounts of an epoxide compound.

Particular suitability is had by compounds (V.I), which in a solvent in which the preparation of the polyurethanes (PUR.Ia) is customarily undertaken, are soluble at 20° C. to the extent of at least 5% by weight and which, per 100 kg, carry from 0.1 to 1 mol of groups with a C—C double bond which is activated by a carbonyl attached directly to it.

With preference, both the polyurethane (PUR.Ia) and the compound (V.I) have a solubility in water of less than 5 g/l, particularly preferably less than 1 g/l (measured at 20° C.).

In the field of polyurethane chemistry it is generally known how the molecular weight of the polyurethanes can be established by choosing the proportions of the mutually reactive monomers and the arithmetic mean of the number of reactive functional groups per molecule.

Normally, components (a1) to (a5) and, respectively, (b1) to (b4) and their respective molar amounts are chosen such that the ratio A:B between A) the molar amount of isocyanate groups and B) the sum of the molar amount of hydroxyls and the molar amount of the functional groups which are able to react with isocyanates in an addition reaction is from 0.5:1 to 2:1, preferably from 0.8:1 to 1.5 and, with particular preference, from 0.9:1 to 1.2:1. With very particular preference, the ratio A:B is as close as possible to 1:1.

The monomers (a4) are preferably employed in amounts such that the polyurethane (PUR.Ia) contains per kg from 50 to 1000 mol, particularly preferably from 0.2 to 1 mol, of groups with a C—C double bond which is activated by a carbonyl attached directly to it.

The novel dispersions can be prepared in a simple fashion by mixing a dispersion (D.I), comprising in dispersed form a polyurethane having groups with a C—C double bond which is activated by a directly attached carbonyl (disperse phase P.I), said dispersion (D.I) nevertheless being essentially free from polyurethanes still carrying isocyanate groups, with a compound which has on average at least 2, preferably from 5 to 200, particularly preferably from 10 to 100 hydrogens, which are then present as amino function, a solubility in water of more than 1 g/l, preferably more than 10 g/l, particularly preferably more than 100 g/l and a number-average molecular weight ($M_n$) of from 200 to 1,000,000, preferably from 400 to 10,000.

The number-average molecular weight can be calculated, for example, from the measured amine number, the determination of which is widely known (cf. DIN. 53176).

Apart from the amino function, the compounds II generally carry no groups able to react with water or with the polymers of phase I. Particularly suitable compounds (II) are amino-terminated poly-C2–C4-alkylene oxides, preference being given to those composed predominantly of ethylene oxide and/or propylene oxide units.

Amines of this kind are known under the trade name Jeffamine® and are described, for example, in EP-A-507143.

The compounds involved are, for example, reaction products of a diprimary polyetherdiamine and, per mole of polyetherdiamine, 2 mol of ethylene, propylene and/or butylene oxide, the conditions for the reaction of the polyetherdiamine with the alkylene oxide being intended to be selected such that, with high selectivity, the N,N'-bis(hydroxyalkylamine) derivative with two secondary amino groups is produced. Examples of the polyetherdiamines are 4,7-dioxadecane-1,10-diamine, 4,11-dioxatetradecane-1,14-diamine, α-(2-aminomethylethyl)-ω-(2-aminomethylethoxy)poly[oxy(methyl-1,2-ethanediyl)] with an MW of from 200 to 3000, and α-(3-aminopropyl)-ω-(3-aminopropoxy)poly[oxy(1,4-butanediyl)] with an MW of from 300 to 3000.

Preferred compounds (II) are, furthermore, branched or unbranched polyethyleneimines with an MW of from 200 to 10,000. Compounds of this kind are commercially available (Polymin® grades from BASF AG) and are described, for example, in U.S. Pat. Nos. 3,200,081, 3,885,069 and in DE-A-1961 19 77.

The polyurethanes (PUR Ia) or the compounds (V.I), on the one hand, and the compounds (II) on the other hand, are preferably present in the novel aqueous dispersions in proportions such that the molar ratio of the carbonyl-activated double bond to the hydrogens of the compound (II) which are present in the form of an amino group is from 0.1:1 to 10:1, preferably from 2:1 to 0.5:1.

Preference is given in particular to those novel aqueous dispersions in which the molar ratio of the carbonyl-activated double bond to the secondary and primary amino groups is from 2:1 to 0.5:1.

The method of mixing dispersion (D.I) with the compound (II) is not critical and may for example be accomplished by stirring the latter into the dispersion.

Dispersions (D.I) which carry a polyurethane (PUR.Ia) with a C—C double bond activated by directly attached carbonyl, for example acryloyl or methacryloyl, are widely known (cf. EP-A-443 537, 183 119, 181 486, 189 945 and 353 797).

The dispersions (D.I) are usually prepared by one of the following methods:

According to the acetone method, a water-dispersible polyurethane is prepared from components (a1) to (a5) and, respectively, (b1) to (b4) in a water-miscible solvent which boils at below 100° C. under atmospheric pressure. The amount of water added is that required to form a dispersion in which water constitutes the coherent phase.

The prepolymer mixing method differs from the acetone method in that, rather than preparing a fully reacted (potentially) water-dispersible polyurethane, instead a water-dispersible prepolymer is first of all prepared which carries isocyanate groups. In this case components (a1) to (a5) and, respectively, (b1) to (b4) are chosen such that the above-defined ratio A:B is greater than 1.0 to 3, preferably from 1.05 to 1.5. The prepolymer is first of all dispersed in water and then if desired is crosslinked, by reacting the isocyanate groups with amines carrying more than 2 isocyanato-reactive amino groups, or chain-extended, with amines carrying 2 isocyanato-reactive aminos. Chain extension also takes place if no amine is added. In this case, isocyanate groups are hydrolyzed to form amino groups, which react with any remaining isocyanate groups of the prepolymers and so extend the chain.

In the case of the prepolymer formed from the monomers (b1) to (b4), the stoichiometric ratio of the starting materials, and the reaction time, are preferably chosen such that the prepolymer prior to its dispersion has a content of less than 0.1% by weight of NCO groups per kg of prepolymer, based on an NCO group weight of 42 g/mol.

The polyaddition reaction of components (a1) to (a5) and, respectively, (b1) to (b4) generally takes place at from 20 to 180° C., preferably from 50 to 150° C., under atmospheric or the autogenous pressure.

The reaction times necessary may extend from a few minutes to several hours. It is familiar in the field of polyurethane chemistry that the reaction time is influenced by a host of parameters such as temperature, monomer concentration, monomer reactivity, etc.

To accelerate the reaction of the diisocyanates it is possible to use the customary catalysts, such as dibutyltin dilaurate, tin(II) octoate or diazabicyclo[2.2.2]octane.

Suitable polymerization apparatus includes stirred vessels, especially when solvents are used to provide for low viscosity and good heat dissipation.

Preferred solvents are of infinite miscibility with water, have a boiling point of from 40 to 100° C. under atmospheric pressure, and react with the monomers slowly if at all.

The dispersions (D.I) comprising as disperse phase (P.I) a mixture of the polyurethane (PUR.Ib) and of the compound (V.I), are expediently prepared by mixing the as yet undispersed polyurethane (PUR.Ib), in the case of the acetone method, and the corresponding prepolymer, in the case of the prepolymer mixing method, with the compound (V.I) and dispersing these mixtures in water. Through this form of codispersion a disperse phase is formed in which the polyurethane (PUR.Ib) and the compound (V.I) are present alongside one another, ie. both together in one particle.

This method of codispersion is described, for example, in DE-A-3 903 538, 4 309 079 and 4 0 24 567 for polymers such as, for example, hydrophobic auxiliaries such as phenol condensation resins formed from aldehydes and phenol and/or phenol derivatives or epoxy resins.

If a solvent has been used in preparing the polyurethane, it is normal to remove the majority of the solvent from the dispersion by means, for example, of distillation under reduced pressure. The dispersions preferably have a solvent content of less than 10% by weight and with particular preference are free from solvents.

These hydrophobic auxiliaries may likewise be present in the disperse phase (P.I).

The dispersions (D.I) generally have a solids content of from 10 to 75% by weight, preferably from 20 to 65% by weight, and a viscosity of from 10 to 500 mPas (measured at 20° C. at a shear rate of 250 s$^{-1}$).

The novel polyurethane dispersions may include further water-emulsifiable or water-dispersible resins, such as polymer, polyurethane, polyester, epoxy or alkyd resins, and also customary commercial auxiliaries and additives, such as propellants, antifoams, emulsifiers, thickeners, thixotropic agents and colorants, such as dyes and pigments.

They are suitable, for example, for bonding or coating a variety of substrates, such as wood, metal, plastics, paper, leather or textiles, and for producing moldings and printing inks.

For these applications, the novel polyurethane dispersions can be processed using the techniques widespread in the adhesives, leather or coatings industry, ie. by spraying, rolling or knife-coating the dispersions onto the substrate and then drying them.

Where the dispersions are processed as adhesives, the coated workpieces are mated, preferably under pressure, with another workpiece either prior to the drying of the dispersion film or after drying.

Particularly firm adhesive bonds are obtained if workpieces which have been provided with a dried adhesive film are heated, directly prior to, during or after mating, to about 50 to 100° C.

The adhesive bonds produced by these methods are particularly notable for their stability on storage and their capacity to be used to produce bonds of high thermal stability.

When employed as a coating for leather, the dispersions give the leathers a surface which on contact with the skin imparts a pleasant feel typical of leather, high durability toward mechanical stresses, and good processing properties, for example when the coated leathers are ironed.

PREPARATION EXAMPLES

The viscosities of the dispersions were measured at 20° C. at a shear rate of 250 s-1 using a rotary rheometer with concentric cylinders (spindle diameter 38.7 mm, cup diameter: 42.0 mm).

The size of the latex particles was determined indirectly by way of turbidity measurements. For this purpose, the turbidity of a dispersion with a solids content of 0.01% by weight was determined relative to distilled water, at room temperature and with a path length of 2.5 cm.

$$LD = \frac{Intensity_{Disp.} \times 100}{Intensity_{Water}}$$

The K value is a measure of the molecular weight of a polymer and as determined by the method described in Kirk-Othmer, Encyclopedia of Chemical Technology, 3rd edition, John Wiley & Sons, Inc., Vol. 23, p.967.

The symbols used in the examples which follow have the meanings given below:

OHN=hydroxyl number
TDI=tolylene diisocyanate
HDI=hexamethylene diisocyanate
PUD salt=Na salt of the Michael adduct of acrylic acid and ethylenediamine
DBTL=dibutyltin dilaurate
DMPA=dimethylolpropionic acid
RT=room temperature
M=molecular weight Example 1(C) (For Comparison)

565.5 g of a polyester of adipic acid and butanediol (OHN=45) were reacted with 29.6 g of TDI together with 0.05 g of DBTL in 152.2 g of acetone at 65° C. for 1 h. 28.6 g of HDI were added, and the mixture was maintained at 65° C. for 37 minutes longer. It was then diluted with 609.9 g of acetone and cooled to 50° C.; the NCO content was 0.65%. 40.95 g of PUD salt were added and, after a few minutes, 160.0 g of an adduct of 2 mol of acrylic acid with 1 mol of bisphenol A bisglycidyl ether in 160 g of acetone were stirred in homogeneously. The mixture was then dispersed with 1200 g of deionized water. Following the addition of an antifoam, the acetone was distilled off under reduced pressure at up to 40° C. The dispersion was adjusted to a solids content of 40%.

Analytical data: Solids content: 40% LD: 51.8% visc.: 26.4 mPas pH: 8.81 double bond content: 0.83 mol/kg.

Example 1

Part of the dispersion was admixed with a 25% strength aqueous solution of a polyethyleneimine of Pn=20, to give equal molar amounts of double bonds and amino groups.

LD: 62 visc.: 34.1 mPas pH: 9.3

A film was formed from the dispersion at 40° C.: K value: undissolved

Example 2 (C) (For Comparison)

595.9 g of a polyester of adipic acid and diethylene glycol (OHN=42) were reacted with 0.1 g of DBTL, 50.2 g of 1,4-butanediol and 80.1 g of TDI in 172 g of acetone at 65° C. for 1 h. Then 77.4 g of HDI were added and the mixture was stirred at 65° C. for 1.5 h more. It was then diluted with 688 g of acetone and cooled to 59° C. The NCO content was 0.69%. Following the addition of 40.95 g of PUD salt, the mixture was stirred for a few minutes, and a solution of 80 g of an adduct of 2 mol of acrylic acid with 1 mol of bisphenol A bisglycidyl ether in 80 g of acetone were stirred in homogeneously. The mixture was then dispersed with 1200 g of deionized water. The acetone was distilled off under reduced pressure at up to 40° C. and the dispersion was adjusted to a solids content of 40%.

Analytical data: Solids content: 40% LD: 87.2% visc.: 121 mPas pH: 8 K value: 85 double bond content: 0.41 mol/kg

Example 2

Part of the dispersion was admixed with equimolar amounts of amine in the form of a polyethyleneimine of Pn=20 as a 50% strength solution.

LD: 83.5 visc.: 76.2 mPas pH: 9.4 K value: 77

A film was formed from the dispersion at 40° C. K value: undissolved.

Example 3 (C) (For Comparison)

641.7 g of a polyester of adipic acid and butanediol (OHN=45) were reacted with 0.03 g of DBTL and 31.5 g of TDI in 171.7 g of acetone at 65° C. for 1 h. Then 30.4 g of HDI were added and the mixture was held at 65° C. for 105 minutes longer. It was then diluted with 688.2 g of acetone and cooled to 50° C.

The NCO content was 0.59%. The mixture was chain-extended with 40.95 g of PUD salt and, after a few minutes, was diluted with 300 g of deionized water. 80 g of a reaction product of 2 mol of acrylic acid with 1 mol of butanediol bisglycidyl ether (M=330 g/mol) were stirred in homogeneously. The mixture was then dispersed with 900 g of deionized water. The acetone was distilled off under reduced pressure at up to 40° C. and the solids content was adjusted to 40%.

Analytical data: Solids content: 40% LD: 89.7 visc.: 37.6 mPas pH: 7.5 K value 57 double bond content: 0.6 mol/kg

Example 3

Part of the dispersion was admixed with an equivalent amount of amine in the form of a polyethyleneimine, Pn=20, as a 25% strength solution.

K value: 55

A film was formed from the dispersion at 40° C. K value: undissolved.

Example 4 (C) (For Comparison)

585.3 g of a polyester of adipic acid and diethyene glycol (OHN=42) were introduced into a reaction vessel as initial charge in 195.5 g of acetone together with 0.5 g of DBTL, 21.45 g of DMPA, 72.3 g of an adduct of 2 mol of acrylic acid with 1 mol of butanediol bisglycidyl ether (M=330 g/mol) and 0.05 g of dimethylhydroquinone, at 40° C. 120.9 g of TDI were added, and the components were reacted at 70° C. for 277 minutes. The mixture was then diluted with 782 g of acetone and cooled to 50° C.; the NCO content was 0.55%. The mixture was neutralized with 25.6 g of 25% strength sodium hydroxide solution and was dispersed with 1200 g of deionized water. The acetone was distilled off under reduced pressure at up to 40° C. and the solids content was adjusted to 40%.

Analytical data: Solids content 40% LD: 73 visc.: 70 mPas pH: 8.6 K value: 39 double bond content: 0.55 mol/kg

Example 4

Part of the dispersion was admixed with a polyethyleneimine, Pn=20, as a 25% strength solution.

Molar ratio of double bonds: amino groups=2:1.

K value: 43

A film is formed from the dispersion at 40° C. K value: undissolved.

Example 5 (C) (For Comparison)

465.2 g of polypropylene oxide diol (OHN=56) were reacted at 110° C. for 122 minutes with 0.5 g of DBTL, 21.4 g of DMPA, 24.2 g of neopentylglycol and 129.2 g of TDI. The mixture was then diluted with 782 g of acetone and cooled to 50° C. It was neutralized with 4.5 g of NaOH in 20 g of deionized water, and 160 g of an adduct of 2 mol of acrylic acid with 1 mol of bisphenol A bisglycidyl ether (M=484) in 160 g of acetone were stirred in homogeneously. The mixture was then dispersed with 1200 g of deionized water. The acetone was distilled off under reduced pressure at up to 40° C. and the solids content was adjusted to 40%.

Analytical data: Solids content: 40% LD: 97 visc.: 417 mPas pH: 8.1 K value: 43 double bond content: 0.83 mol/kg

Example 5

Part of the dispersion was admixed with a 25% strength solution of a polyethyleneimine, Pn=20. Equimolar amounts of amine and double bonds were present.

K value: 47

Example 6 (C) (For Comparison)

400 g (0.2 mol) of a polyesterol of adipic acid, neopentylglycol and hexanediol, of OH number 56, 21.4 g (0.16 mol) of dimethylolpropionic acid and 14.3 g (0.106 mol) of trimethylolpropane were mixed. 127.2 g (0.73 mol) of tolylene diisocyanate were added, and the mixture was reacted at 100° C. for 90 minutes. It was then cooled to 80° C., and 0.37 g of hydroquinone monomethyl ether and 37.2 g (0.32 mol) of hydroxyethyl acrylate were added. After 120 minutes at 80° C., dilution was carried out with 500 g of acetone. The NCO content was 0.32% by weight (calc. 0.38%). Then 15.1 g (0.15 mol) of triethylamine were mixed in, and the mixture was dispersed by adding 1200 g of water. The acetone was then distilled off under reduced pressure, to give a fine dispersion with a solids content of 34.0% and a double bond (DB) content of 177 mmol/kg of dispersion.

Example 6

200 g of the PUR dispersion (35.2 mmol DB) were admixed with 1.0 g of Polymin G 10 (23.3 mmol NH) and adjusted with 29 g of water to a solids content of 30%.

Example 6a 200 g of the PUR dispersion (35.2 mmol DB) were admixed with 2.0 g of Polymin G 10 (46.5 mmol NH) and adjusted with 31.5 g of water to a solids content of 30%.

Example 6b 200 g of the PUR dispersion (35.2 mmol DB) were admixed with 5.0 g of Polymin G 10 (116.3 mmol NH) and adjusted with 38.5 g of water to a solids content of 30%.

A Performance testing as an adhesive

The dispersions were thickened with 2% of Collacral VL, knife-coated as layers 2 mm thick onto each of 5 fiberboard panels (20 cm×3 cm), and dried at RT for 60 minutes or at 60° C. for 3 minutes. Then an ASA film or PVC film was pressed on at 80° C. for 30 s and at 0.5 N/mm$^2$.

The thermal stability was determined by way of the peel strength. The thermal stability (TS) was tested after 24 h, by subjecting the ASA film or PVC film to a weight of 300 g at a peel angle of 180°. The temperature was raised by 10° C. every 30 minutes. The thermal stability parameter indicated was the highest temperature at which the peel length was less than 50 mm.

The test results are compiled in Table 1

TABLE 1

| Example | TS [° C.] |
|---|---|
| 1* | 5 × 90 |
| 1 (C)* | 5 × 60 |
| 2** | 5 × >120 |
| 2 (C)** | 5 × 90 |

*with PVC film, dried at RT for 60 minutes
**with ASA film, dried at 60° C. for 3 minutes B. Performance testing as a leather coating The dispersions specified in Table 2 were applied as a finish to bottomed cattle box leather.

The testing of the long-term flexural strength was carried out in accordance with DIN 53 351/IuP (method of physical leather testing from the International Union of Leather Chemists) using the Bally Flexometer.

The wet abrasion was tested using the WESSLIC rub fastness test in accordance with IUF 450 (International Union Fastness). The test was carried out after the coated leathers had been stored for the times indicated in the table.

Assessment was in accordance with the extent of damage 0 none, g slight, d marked damage, s severe damage

TABLE

| Examples | Flex. dry[1] | Flex. wet[2] | Wet abrasion 1d[3] | 5d[4] | 5d[5] |
|---|---|---|---|---|---|
| 6 (C) | — | — | — | — | — |
| 6 | 0 | 0 | 50 × g | 50 × g-l | 50 × g-d |
| 6a | 0 | 0 | 100 × g-d | 50 × g-d | 50 × g-d |
| 6b | 0 | 0 | 50 × g-s | 50 × g-d | 50 × g-d |

[1]after 50,000 creases
[2]after 20,000 creases
[3]after storage for 3 days at RT
[4]after storage for 5 days at RT
[5]after storage for 5 days at RT and additional storage for 1 hour at 80° C.

The leather coated with the dispersion of Example 6 (C) was too tacky to be tested.

We claim:

1. An aqueous latent-crosslinking polyurethane dispersion, comprising
   I) a disperse phase (P.I) comprising:
      Ia) a polyurethane (PUR.Ia) carrying not only groups which render the polyurethane dispersible in water but also groups with a C—C double bond which is activated by a carbonyl attached directly to it, or
      Ib) a mixture of
         a polyurethane (PUR.Ib) carrying groups which render the polyurethane dispersible in water but also groups with a C—C double bond which is activated by a carbonyl attached directly to it, and
         a compound (V.I) different from the polyurethane PUR.Ia and PUR.Ib., which carries groups with a C—C double bond which is activated by a carbonyl attached directly to it, and
   II) an aqueous phase (P.II) comprising:
      IIa) water, and
      IIb) a compound having
         an average at least 2 hydrogens present in the form of amino function,
         a solubility in water of more than 1 g/l (25° C.) and a number-average molecular weight (Mn) of from 200 to 1,000,000 (compound II).

2. An aqueous dispersion as claimed in claim 1, wherein the phase (P.I) comprises a polyurethane (PUR.Ia) composed of
   a1) polyfunctional isocyanates of 4 to 30 carbons,
   a2) polyols, of which
      a2.1) from 10 to 100 mol-%, based on the overall amount of the diols (a2), have a molecular weight of from 500 to 5000, and
      a2.2) from 0 to 90 mol-%, based on the overall amount of the diols (a2), have a molecular weight of from 60 to 500 g/mol,
   a3) monomers which are different from monomers (a1) and (a2) and have at least one isocyanate group or at least one isocyanato-reactive group and which, moreover, carry at least one hydrophilic group or potentially hydrophilic group, by means of which the polyurethanes are made dispersible in water,
   a4) monomers which are different from monomers (a1), (a2) and (a3) and have at least one isocyanate group or at least one isocyanato-reactive group and which, moreover, carry at least one acryloyl and methacryloyl group, and
   a5) if desired, further polyfunctional compounds which are different from the monomers (a2) to (a4) and have isocyanato-reactive groups which are alcoholic hydroxyl or primary or secondary amino groups.

3. An aqueous dispersion as claimed in claim 1 or 2, wherein the phase (P.I) is a mixture of
   a polyurethane (PUR.Ib) and
   a polyurethane (PUR.Ic) as compound (V.I),
   the polyurethane (PUR.Ib) being composed of
      b1) polyfunctional isocyanates of 4 to 30 carbons,
      b2) polyols, of which
         b2.1) from 10 to 100 mol-%, based on the overall amount of the diols (b2), have a molecular weight of from 500 to 5000, and
         b2.2) from 0 to 90 mol-%, based on the overall amount of the diols (b2), have a molecular weight of from 60 to 500 g/mol,
      b3) monomers which are different from monomers (b1) and (b2) and carry at least one isocyanate group or at least one isocyanato-reactive group, and which, moreover, carry at least one hydrophilic group or a potentially hydrophilic group, whereby the polyurethanes are made dispersible in water, and
      b4) if desired, further polyfunctional compounds, different from the polyols (b2) and monomers (b3), having isocyanato-reactive groups which are alcoholic hydroxyls or primary or secondary aminos,
   and the polyurethane (PUR.Ic) being composed of
      c1) polyfunctional isocyanates of 4 to 30 carbons,
      c2) polyols, of which
         c2.1) from 10 to 100 mol-%, based on the overall amount of the diols (c2), have a molecular weight of from 500 to 5000, and
         c2.2) from 0 to 90 mol-%, based on the overall amount of the diols (c2), have a molecular weight of from 60 to 500 g/mol,
      c3) monomers which are different from monomers (c1) and (c2) and have at least one isocyanate group or at least one isocyanato-reactive group and which, moreover, carry at least one acryloyl or methacryloyl group.

4. An aqueous dispersion as claimed in any of claims 1 to 3, wherein the monomer (a4) or (c3) is a $C_1$–$C_6$-hydroxyalkyl acrylate, a $C_1$–$C_6$ hydroxyalkyl methacrylate or a bisadduct of acrylic acid and/or methacrylic acid with a bisepoxide.

5. An aqueous dispersion as claimed in any of claims 1 to 4, wherein a branched or unbranched polyethyleneimine is employed as compound II.

6. An aqueous dispersion as claimed in any of claims 1 to 5, wherein a poly-$C_2$–$C_4$-alkylene oxide with $NH_2$ groups at the chain ends is employed as compound II.

7. An aqueous dispersion as claimed in any of claims 1 to 6, wherein the molar ratio of the double bonds activated by carbonyl to the hydrogens present in amino form is from 0.1:1 to 10:1.

8. An aqueous latent-crosslinking polyurethane dispersion as claimed in any of claims 1 to 7, wherein the groups with a C—C double bond activated by carbonyl attached directly to it, as carried by the polyurethanes PUR.Ia and PUR.Ic, are acryloyl.

9. A process for impregnating, coating or bonding articles of wood, metal, textile, leather or plastic using a dispersion as claimed in any of claims 1 to 8.

10. An article of wood, metal, textile, leather or plastic which is coated, impregnated or bonded with an aqueous dispersion as claimed in any of claims 1 to 8.

* * * * *